United States Patent [19]
Kolodziej et al.

[11] Patent Number: 5,803,406
[45] Date of Patent: Sep. 8, 1998

[54] INTEGRATED THERMAL INSULATION SYSTEM FOR SPACECRAFT

[75] Inventors: Paul Kolodziej, Redwood City; Jeff Bull, San Jose; Thomas Kowalski, Cupertino; Matthew Switzer, Santa Clara, all of Calif.

[73] Assignee: The United States of America as represented by the Administrator of the National Aeronautics and Space Administration, Washington, D.C.

[21] Appl. No.: 656,144

[22] Filed: Apr. 22, 1996

[51] Int. Cl.⁶ .................................................. B64G 1/58
[52] U.S. Cl. ................ 244/158 A; 244/131; 244/132
[58] Field of Search ............................. 244/158 A, 131, 244/132, 133

[56] References Cited

U.S. PATENT DOCUMENTS

| | | |
|---|---|---|
| 3,769,511 | 10/1973 | Delacy . |
| 3,799,056 | 3/1974 | Colignon . |
| 4,124,732 | 11/1978 | Leger . |
| 4,151,800 | 5/1979 | Dotts et al. . |
| 4,330,572 | 5/1982 | Holt et al. . |
| 4,344,591 | 8/1982 | Jackson . |
| 4,439,968 | 4/1984 | Dunn . |
| 4,456,208 | 6/1984 | MacConochie et al. . |
| 4,557,444 | 12/1985 | Jackson et al. ............. 244/158 A X |
| 4,702,439 | 10/1987 | Kelley et al. ................ 244/158 A |
| 4,713,275 | 12/1987 | Riccitiello et al. . |
| 4,804,571 | 2/1989 | Jouffreau ..................... 244/158 A X |
| 4,892,783 | 1/1990 | Brazel . |
| 4,919,366 | 4/1990 | Cormier . |
| 5,310,141 | 5/1994 | Homer et al. ................ 244/158 A X |
| 5,310,592 | 5/1994 | Baker et al. . |
| 5,330,124 | 7/1994 | Le Touche .................. 244/158 A X |
| 5,429,875 | 7/1995 | Okamoto et al. . |
| 5,474,262 | 12/1995 | Fiore ............................ 244/158 A |
| 5,489,074 | 2/1996 | Arnold et al. ............... 244/158 A |
| 5,575,439 | 11/1996 | Heinze et al. ............... 244/158 A X |

FOREIGN PATENT DOCUMENTS

| | | | |
|---|---|---|---|
| 2284287 | 12/1987 | Japan ............................ 244/158 A |
| 3253498 | 11/1991 | Japan ............................ 244/158 A |
| 597099 | 4/1993 | Japan ............................ 244/158 A |

*Primary Examiner*—William Grant
*Attorney, Agent, or Firm*—Kenneth L. Warsh; Gary Borda; John G. Mannix

[57] ABSTRACT

An integrated thermal protection system (TPS) for a spacecraft includes a grid that is bonded to skin of the spacecraft, e.g., to support the structural loads of the spacecraft. A plurality of thermally insulative, relatively large panels are positioned on the grid to cover the skin of the spacecraft to which the grid has been bonded. Each panel includes a rounded front edge and a front flange depending downwardly from the front edge. Also, each panel includes a rear edge formed with a rounded socket for receiving the rounded front edge of another panel therein, and a respective rear flange depends downwardly from each rear edge. Pins are formed on the front flanges, and pin receptacles are formed on the rear flanges, such that the pins of a panel mechanically interlock with the receptacles of the immediately forward panel. To reduce the transfer to the skin of heat which happens to leak through the panels to the grid, the grid includes stringers that are chair-shaped in cross-section.

10 Claims, 3 Drawing Sheets

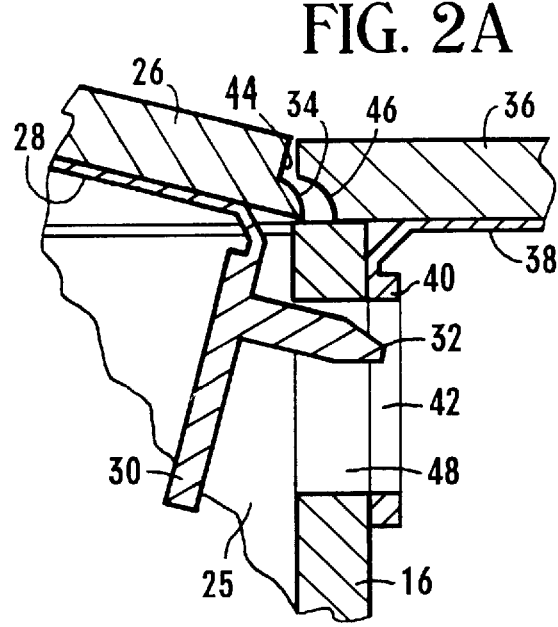

INTEGRATED THERMAL INSULATION SYSTEM FOR SPACECRAFT

This invention described herein was made by employees of the United States federal Government and may be manufactured and used by and for the Government for governmental purposes without payment of any royalties thereon or therefor.

BACKGROUND OF THE INVENTION a. Technical Field of the Invention

The present invention relates generally to thermal protection systems for spacecraft during ascent and reentry, and more particularly to integrated thermal insulation systems for spacecraft.

b. Description of the Prior Art

Spacecraft must be protected from frictional heat that is generated when the spacecraft move rapidly through the Earth's atmosphere during ascent and reentry. Accordingly, thermal protection systems (TPS) have been developed to protect spacecraft from high temperatures during the spacecrafts' passage through the atmosphere.

Typical of TPS is the system currently used to protect U.S. space shuttles from heat. Essentially, the TPS used on the shuttle consists of a large number of small, thermally insulative tiles which are bonded to the skin of the shuttle. Also, some TPS incorporate insulative material that is bolted to certain parts of the spacecraft, i.e., to hatches of the spacecraft.

It will be appreciated that the skin of a reusable spacecraft is not uniformly flat, and indeed is designed principally with aerodynamic considerations in mind to optimize the craft's performance during ascent and reentry. Consequently, the tiles must be precisely machined to conform to the contour of the skin of the spacecraft. This is to ensure that the bottom surface of each tile fits flushly against the skin of the spacecraft, and to ensure that the tiles themselves fit closely with adjacent tiles, to minimize heat transfer between joints that are established between adjacent tiles.

Unfortunately, using perhaps thousands of small tiles necessitates manufacturing, installing, inspecting, and replacing thousands of tiles per spacecraft, which is expensive and time consuming. Additionally, the use of thousands of small tiles in turn establishes thousands of tile joints, any one of which could potentially fail with catastrophic results.

The installation, removal, and replacement of TPS material is compounded by the methods, mentioned above, that are used to attach the TPS material to a spacecraft. More particularly, tiles that are damaged must be separated from the spacecraft, which is cumbersome and often results in the destruction of adjacent tiles during the separation process. Then, after replacement tiles have been installed, a cumbersome inspection must be performed. Furthermore, access to the bolts of TPS material which covers hatches can be established only by drilling through and thus destroying the TPS material.

As recognized by the present invention, however, relatively large, easily replaceable thermally insulative panels which are not bonded directly to the skin of a spacecraft can afford the advantage of easily replacing a single panel instead of many small tiles, thereby saving time and resources. Moreover, a single large panel would eliminate many of the joints that are currently established between small tiles, thereby increasing the reliability of the TPS. As further recognized herein, the large panels of such a system need not necessarily have inner bonding surfaces configured for conforming to an aerodynamic profile, if the entire TPS is taken into account during spacecraft design such that the integrated system is aerodynamically optimized.

Accordingly, it is an object of the present invention to provide an integrated system that uses relatively large panels to thermally insulate a spacecraft. Another object of the present invention is to provide a thermal insulation system for spacecraft in which the insulation components are relatively easy and inexpensive to install and replace. Yet another object of the present invention is to provide a TPS for spacecraft which is easy to use and cost effective.

SUMMARY OF THE INVENTION

A thermal protection system (TPS) is disclosed for a spacecraft that defines a front and a rear while in aerodynamic flight. The TPS of the present invention includes a support frame attached to the spacecraft, and a first thermally insulative panel positionable on the support frame. Per the present invention, the first panel includes a first edge.

A second thermally insulative panel is positionable on the support frame adjacent the first panel, with the second panel including a second edge configured for interlocking engagement with the first edge of the first panel. To hold the first panel onto the frame, a hold down fastener, preferably a bolt, is engageable with the support frame and the first panel.

In a preferred embodiment, the first panel is a front panel, the first edge is a rear edge, the second panel is a rear panel, and the second edge is a front edge. In this embodiment, the front edge of the rear panel is formed with a fastener hole for receiving the fastener therethrough.

Preferably, the frame is a grid which includes a plurality of stringers, and each stringer is formed with two co-parallel surfaces offset from each other. Also, each stringer includes a perpendicular surface interconnecting the co-parallel surfaces. In a particularly preferred embodiment, each stringer includes a respective upper member that is closely juxtaposed with and affixed to a respective lower member. If desired, the members of each stringer can be configured to mechanically interlock with each other.

As intended by the preferred embodiment, the spacecraft defines a longitudinal dimension between the front and the rear of the spacecraft. To provide for interlocking engagement between adjacent panels, the front edge of the rear panel is rounded, while the rear edge of the front panel defines a rounded socket for rotatably receiving the front edge of the rear panel therein. The rear panel defines a rear edge, and the rear panel can be pivotably lowered from an install position, wherein the rear edge of the rear panel is distanced from the frame, and an operating position, wherein the rear edge of the rear panel is closely juxtaposed with the frame.

In another aspect of the present invention, in a spacecraft including an external support frame, a thermal protection system (TPS) is disclosed which includes a front thermally insulative panel positioned on the frame and fastened thereto. The TPS also includes a rear thermally insulative panel positioned behind the front panel relative to the spacecraft and interlocked with the front panel.

In still another aspect, a method for thermally insulating a spacecraft having a skin includes attaching a frame to the skin of the spacecraft, and positioning a front panel on the frame, wherein the front panel includes a rear. A rear panel is positioned on the frame, and the rear panel includes a front. Per the present invention, the front of the rear panel is mechanically interlocked with the rear of the front panel.

The details of the present invention, both as to its construction and operation, can best be appreciated in reference to the accompanying drawings, in which like reference numerals refer to like parts, and in which:

BRIEF DESCRIPTION OF THE DRAWINGS

FIG. 2A is a cross-sectional view similar to FIG. 2, showing an alternate embodiment of the pin.

DETAILED DESCRIPTION OF THE INVENTION

Figure 1:
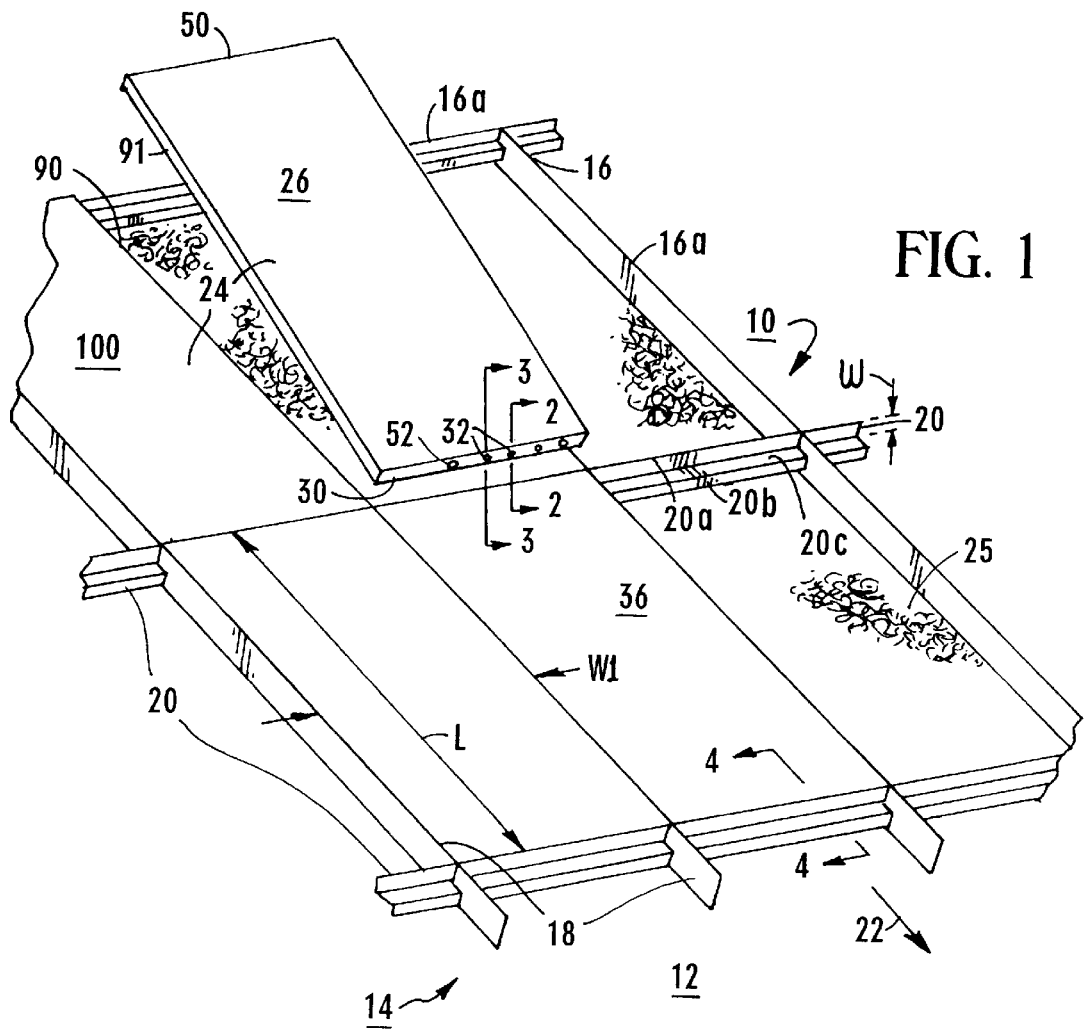
FIG. 1 is a perspective view of the integrated thermal insulation system of the present invention, with portions broken away, and with some panels properly positioned on the frame in an operating position, other panels removed from the frame, and still other panels shown in an install position.

Referring initially to FIG. 1, a system is shown, generally designated 10, for thermally insulating the skin 12 of a spacecraft, generally designated 14. In the preferred embodiment shown, the skin 12 is part of a cryotank of the spacecraft 14, although other airframe surfaces of the spacecraft 14 can be covered by the system of the present invention.

As shown, the system 10 includes a support frame 16 that is adhesively bonded or otherwise affixed, such as by welding, to the skin 12. Alternatively, however, the support frame 16 and skin 12 can be fabricated integrally by selective removal of material using mechanical or chemical milling techniques. As intended by the present invention, the frame 16 supports the skin 12 of the cryotank/airframe to which it is bonded. It can be appreciated in reference to FIG. 1 that the frame 16 is a grid that is established by a plurality of co-parallel runners 18 and a plurality of co-parallel stringers 20 which are orthogonal to the runners 18. As intended by the present invention, the runners 18 are oriented in the direction of spacecraft flight as indicated by the arrow 22, i.e., the runners 18 are oriented fore-and-aft relative to the spacecraft 14. In the preferred embodiment, the runners 18, stringers 20, and skin 12 are made of graphite/epoxy or graphite/polyimide composite structural material.

In accordance with the present invention, each runner 18 is elongated in the fore-and-aft dimension. On the other hand, each stringer 20 is elongated in the transverse dimension defined by the spacecraft 14. Moreover, the runners 18 and stringers 20 can be flat or chair-shaped in transverse cross-section, with the embodiment shown in FIG. 1 having chair-shaped stringers 20 and flat runners 18. Specifically, taking a stringer 20 as being exemplary of the transverse configuration of each runner 18 and stringer 20, two co-parallel vertical (with respect to the skin 12) surfaces 20a, 20b are offset from each other, and a horizontal (with respect to the skin 12) surface 20c is perpendicular to and interconnects the co-parallel vertical surfaces 20a, 20b. In one presently preferred embodiment, the width of the horizontal surface 20c is about an inch, and the widths of the other surfaces 20b, 20a are likewise about an inch. With this combination of structure, heat transfer across the runners 18 and stringers 20 are reduced, vis-a-vis a flat, plate-like configuration. Preferably, to further reduce heat transfer, physical contact between the runners 18 and stringers 20 is minimized and indeed eliminated. Further details of the chair-shaped configuration of the runners 18 and stringers 20 are disclosed below in reference to FIGS. 4–7.

Still referring to FIG. 1, a plurality of thermally insulative panels 24 are positioned on the frame 16. More particularly, when the panels 24 are properly positioned on the frame 16, each panel 24 is coupled to the frame 16 as more fully disclosed below with the front and rear edges of each panel 24 being juxtaposed with, i.e., bounded by, two respective stringers 20 and the left and right edges of each panel 24 being juxtaposed with, i.e., bounded by, two respective runners 18. Also, as can be appreciated in reference to FIG. 1 when a panel 24 is properly positioned on the frame 16, the major surface of the front panel 24 is substantially flush (i.e., is co-planar) with top edges 16a of the runners 18 and stringers 20.

As shown, each panel 24 is generally flat and parallelepiped-shaped, with a length "L" between stringers 20 of about four feet and a width "W1" between runners 18 of about two feet. It is to be understood, however, that the panels 24 can have conformations and sizes other than the flat one shown, as appropriate for the aerodynamic requirements of the system 10. Per the present invention, the panels 24 can be rigid tiles or flexible blankets made of an appropriate TPS material, e.g., a fibrous spacecraft thermal protection system (TPS) material such as any one of the silica fiber-based or alumina fiber-based materials disclosed in U.S. Pat. No. 3,952,083 and colloquially referred to as, for example, "FRCI", "AETB", "HTP". Desirably, foam insulation 25 is disposed in the frame 16 underneath the panels 24.

Figure 2:
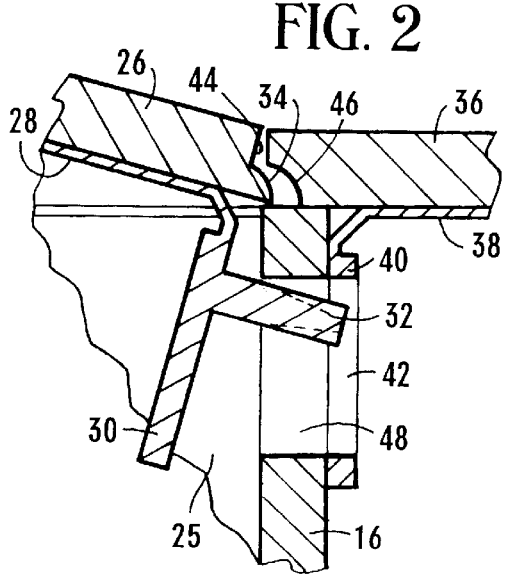
FIG. 2 is a cross-sectional view, as would be seen along the line 2—2 in FIG. 1 with the pins positioned in their respective receptacles before lowering the rear panel into position.
Figure 3:
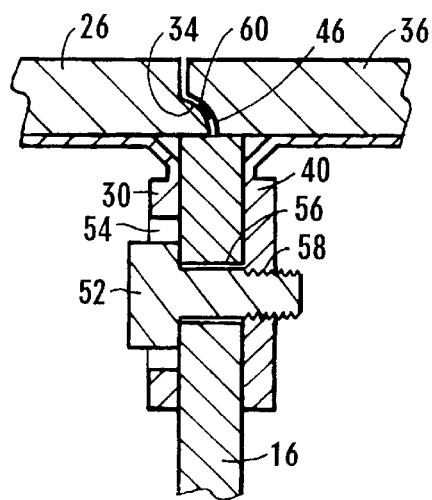
FIG. 3 is a cross-sectional view, as would be seen along the line 3—3 in FIG. 1 with the hold-down bolts engaged with their respective fitting, with the rear panel lowered into position flush with the forward panel.

Now referring to FIGS. 2 and 3, the details of the means by which the panels 24 are coupled to the frame 16 and interlocked with each other can be seen. As best shown in FIG. 2, a rear panel 26, shown in an install position, includes a bottom support 28, with the support 28 being adhesively bonded to the thermally insulative material of the rear panel 26. In turn, the support 28 is formed with a downwardly depending front flange 30, and the front flange 30 is formed with preferably three cylindrically-shaped forward-protruding pins 32. In other words, the pins 32 protrude frontwardly away from the front flange 30. Alternatively, the pins 32 can be tapered, as shown in FIG. 2A.

As additionally shown in FIG. 2, the rear panel 26 defines a front edge 34 which is oriented transversely to the direction of flight of the spacecraft 14. In accordance with the present invention, a portion of the front edge 34 is rounded to establish a rule joint land (i.e., a male rounded rule joint).

A front panel 36, shown in FIG. 2 in an operating position, is positioned on the frame 16 in front of (with respect to the direction of aerodynamic flight of the spacecraft 14) the rear panel 26. FIG. 2 shows that the front panel 36 includes a bottom support 38, with the support 38 being adhesively bonded to the thermally insulative material of the front panel 36. In turn, the support 38 is formed with a downwardly depending rear flange 40, and the rear flange 40 is formed with three pin receptacles 42. As shown in FIG. 3, the flanges 30, 40 longitudinally overlap the frame 16.

Furthermore, the front panel 36 defines a transversely-oriented rear edge 46 formed with a rounded rule joint socket (i.e., a female rule joint). It is to be understood that the side edges of the panels 24 can be similarly configured to the front and rear edges. Thus, for example, a side edge 91 of the rear panel 26 can be configured as a female rule joint, and a corresponding side edge 90 of an adjacent panel 100 that faces the side edge 91 of the rear panel 26 configured as a male rule joint for engaging the female rule joint established by the side edge 91. Accordingly, while the present discussion focusses on the cooperation of structure between juxtaposed front and rear edges, it applies as well to juxtaposed side edges of the panels 24 of the present invention.

As can be appreciated in reference to FIG. 2, with the front panel 36 disposed in the operating position as shown, the rear panel 26 can be positioned in the install position as shown with the pins 32 protruding through respective openings 48 in the frame 16 and into respective pin receptacles 42 of the front panel 36. If desired, each receptacle 42 can be configured as a skeleton keyhole to cooperate with tapered pins 32 and thereby facilitate alignment of adjacent panels 24 with each other. As also shown, the rule joint socket 46 of the front panel 36 rotatably receives the rule joint land 34 of the rear panel 26.

Consequently, the rear panel 26 can be positioned in the install position shown, wherein a rear edge 50 (FIG. 1) of the rear panel 26 is distanced from the frame 16, and then pivoted downwardly to lower the rear panel 26 into the operating position, wherein the rear edge 50 is closely juxtaposed with the frame 16. It will be appreciated that when both the front panel 36 and rear panel 26 are in the operating position, the panels 26, 36 are mechanically interlocked with each other, with the frame 16 sandwiched between the flanges 30, 40 of the rear and front panels 26, 36. It can be further appreciated that the material resiliency of the foam insulation 25 tends to hold both panels 26, 36 in the operating position.

As intended by the present invention, once the panels 26, 36 are interlocked with each other, they are held in the operating position by fasteners. More specifically, as shown in FIG. 3 a threaded hold down fastener 52 extends through a fastener hole 54 formed in the front flange 30 of the rear panel 26. Also, the hold down fastener 52 extends through a fastener hole 56 formed in the frame 16, the fastener 52 is threadably engaged with an internally threaded hold down fastener channel 58 formed in or attached to the rear flange 40 of the front panel 36. Thereby, the front panel 36 is held onto the frame 16.

It can be appreciated in cross-reference to FIGS. 1 and 3 that two fasteners 52 per panel 24 are incorporated in the presently preferred embodiment, although the actual number of fasteners may be greater or fewer than two, depending on the particular configuration of the panels 24. It is to be understood that each of the fasteners 52 are laterally located between two of the three pins 32. Advantageously, to further couple the panels 26, 36 and to increase the effectiveness of the thermal shielding provided by the system 10, an adhesive 60, for example, the silicone vulcanizing elastomer RTV-560 made by General Electric, is deposited between the rule joint land 34 and the rule joint socket 46. While the discussion above focussed on two panels 26, 36, it is to be understood that the panels 24 of the system 10 are interlockingly engaged with their immediately front and rear panels and the frame 16 in accordance with principles discussed above.

Figure 4:
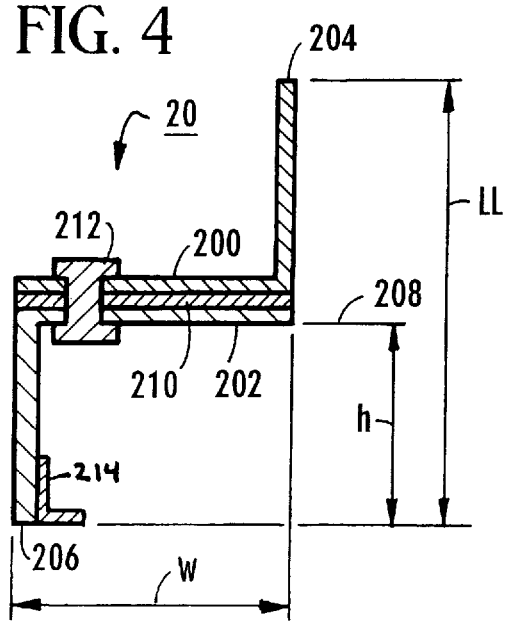
FIG. 4 is a transverse cross-sectional view of a stringer, as seen along the line 4—4 in FIG. 1, showing two "L"-shaped sections.

Now referring to FIG. 4, each stringer, generally designated 20, is generally chair-shaped to reduce heat conduction and thermal stresses between the skin 12 and panels 24. As shown, each stringer 20 includes a respective "L"-shaped (in transverse cross-section) upper member 200 which is closely juxtaposed with and affixed to a respective "L"-shaped lower member 202. As further shown, the members 200, 202 are oriented to establish a chair-shaped stringer 20. In the simplest configuration, the members 200, 202 are made integrally together of the same material. Advantageously, the upper member 200 is made of a material that has the same coefficient of thermal expansion (CTE) as the panels 24, while the lower member 202 is made of a material having the same CTE as the skin 12. Thereby, thermal stresses between the skin 12 and panels 24 are further reduced.

FIG. 4 designates the vertical distance between a top edge 204 of the upper member 200 and a lower edge 206 of the lower member 202 as "LL", whereas the vertical distance between the lower edge 206 of the lower member 202 and the horizontal centerline 208 of the stringer 20 is designated as "h". Also, the horizontal distance between the lower edge 206 and the top edge 204 is designated as "W". Preferably, the ratio of "h" to "LL" is about eighteen hundred seventy five to ten thousand (.1875), to further reduce heat conduction from the panels 24 to the skin 12.

As shown in FIG. 4, a gasket 210 can be sandwiched between the members 200, 202 to provide stress relief for thermal expansion between the members 200, 202, to thermally insulate the members 200, 202 from each other, and to establish a slip surface. One or more mechanical fasteners 212 hold the members 200, 202 together. If desired, a bracket 214 can interconnect the lower member 202 with the skin 12 (FIG. 1) to support the lower member 202.

Figure 5:
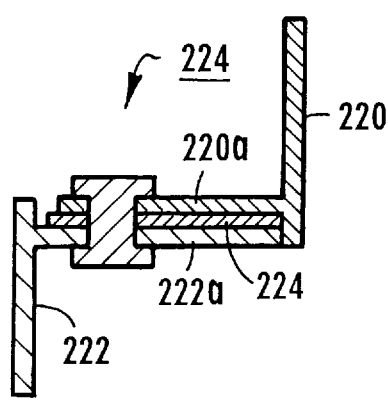
FIG. 5 is a transverse cross-sectional view of an alternate embodiment of a stringer of the present invention, as would be seen along the line 4—4 in FIG. 1, showing two "T"-shaped sections.
Figure 6:
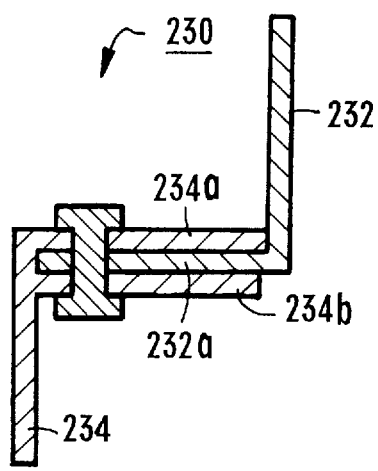
FIG. 6 is a transverse cross-sectional view of yet another alternate embodiment of a stringer of the present invention, as would be seen along the line 4—4 in FIG. 1, showing an "F"-shaped section in interlocking engagement with a "J"-shaped section.
Figure 7:
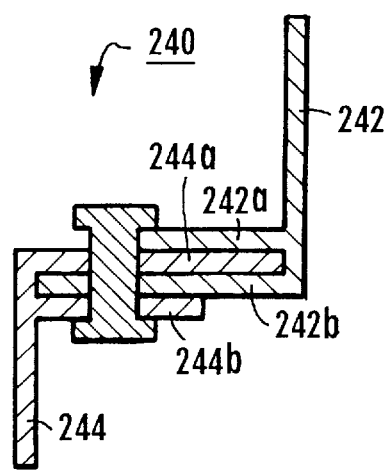
FIG. 7 is a transverse cross-sectional view of still another alternate embodiment of a stringer of the present invention, as would be seen along the line 4—4 in FIG. 1, showing two "F"-shaped sections.

FIGS. 5–7 show alternate embodiments of the chair-shaped stringers (and runners) of the present invention that are in all other essential respects like the stringer 20 shown in FIG. 4. More specifically, upper and lower members 220, 222 of a stringer 224 (FIG. 5) can each be "T"-shaped, with a base 220a of the upper member 220 being juxtaposed with a base 222a of the lower member 222. A gasket 226 is sandwiched between the members 220, 222.

Alternatively, FIGS. 6 and 7 show that if desired, the stringer members of the present invention can be configured to mechanically interlock. More specifically, as shown in FIG. 6, a gasketless stringer 230 can include an "L"-shaped upper member 232 which includes an arm 232a that is sandwiched between opposed arms 234a, b of an "F"-shaped lower member 234. Or, as shown in FIG. 7, a gasketless stringer 240 can include an inverted "F"-shaped upper member 242 which includes arms 242a, b mechanically interlocked with arms 244a, b of an "F"-shaped lower member 244.

While the particular INTEGRATED THERMAL INSULATION SYSTEM FOR SPACECRAFT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A thermal protection system (TPS) for a spacecraft defining a front and a rear while in aerodynamic flight and having an external skin, the TPS comprising:

a support frame attached to the skin of the spacecraft;

at least a first thermally insulative panel positionable on the support frame, the first panel including a first edge;

at least a second thermally insulative panel positionable on the support frame adjacent the first panel, the second panel including a second edge configured for interlocking engagement with the first edge of the first panel;

at least one alignment pin on the second panel and engageable with the first panel to align and interlock the panels together; and at least one hold down fastener engageable with the support frame and the first panel to hold the first panel onto the frame.

2. The TPS of claim 1, wherein the first panel is a front panel, the first edge is a rear edge, the second panel is a rear panel, the second edge is a front edge, and wherein the front edge of the rear panel is formed with a fastener hole for receiving the fastener.

3. The TPS of claim 2, wherein the spacecraft defines a longitudinal dimension between the front and the rear of the spacecraft, and the front edge of the rear panel is rounded.

4. The TPS of claim 3, wherein the front panel defines a rounded socket formed in the rear edge for rotatably receiving the front edge of the rear panel therein.

5. The TPS of claim 4, wherein the rear panel defines a rear edge, and the rear panel can be pivotably lowered from an install position, wherein the rear edge of the rear panel is distanced from the frame, and an operating position, wherein the rear edge of the rear panel is closely juxtaposed with the frame.

6. The TPS of claim 1, wherein the frame is a grid including a plurality of stringers, each stringer being formed with two co-parallel surfaces offset from each other and a perpendicular surface interconnecting the co-parallel surfaces.

7. The TPS of claim 6, wherein each stringer includes a respective upper member closely juxtaposed with and affixed to a respective lower member.

8. The TPS of claim 7, wherein the members of the stringer mechanically interlock with each other.

9. The TPS of claim 1, wherein the fastener is an easily removable fastener.

10. The TPS of claim 1, wherein the pin is tapered, the frame includes longitudinal runners and transverse stringer, and the runners do not contact the stringers.

* * * * *